Dec. 23, 1924.

H. V. HAIGHT

AIR LINE OILER

Filed Feb. 6, 1924

1,520,023

INVENTOR

Harry V. Haight

BY

HIS ATTORNEY

Patented Dec. 23, 1924.

1,520,023

UNITED STATES PATENT OFFICE.

HARRY V. HAIGHT, OF SHERBROOKE, QUEBEC, CANADA, ASSIGNOR TO INGERSOLL-RAND COMPANY, OF JERSEY CITY, NEW JERSEY, A CORPORATION OF NEW JERSEY.

AIR-LINE OILER.

Application filed February 6, 1924. Serial No. 690,986.

*To all whom it may concern:*

Be it known that I, HARRY V. HAIGHT, a citizen of the Dominion of Canada, and a resident of Sherbrooke, Province of Quebec, Canada, have invented a certain Air-Line Oiler, of which the following is a specification accompanied by drawings.

This invention relates to that type of lubricators for machines which are operated by compressed air or other elastic fluids, but more particularly to an air line oiler, which is adapted to be connected to an air line, for conveying lubricant in minute particles to a machine, such as a fluid actuated rock drill, for lubricating the working parts thereof.

Rock drills, pneumatic tools and other elastic fluid operated machines must receive constant lubrication in order to obtain the best results. The amount of lubricant must be regulated in such a manner that barely sufficient lubricant is supplied to the machine to enable every part to operate efficiently, yet prevent the admission of an excess amount which would interfere with the smooth running. In order to accomplish this end, several methods have been attempted and found to be more or less satisfactory, for example a reservoir in the machine itself, but none of these methods have eliminated the carelessness of the operator who often times neglects the lubrication.

The present invention is designed to overcome the above mentioned difficulties, and contemplates the use of an automatic oiler connected to the air line, which is adapted to convey the compressed elastic fluid to the machine, so that as the fluid passes through the air line it will be impregnated with lubricant and thereby enable every working part of the machine to receive adequate lubrication.

Another object of the invention is to enable the amount of lubricant supplied to the air line to be regulated so that a greater or less quantity of lubricant can be supplied to the machine or the supply shut off entirely.

A further object of the invention, is to produce an air line oiler which is simple in its construction, is composed of but few parts, is sturdy and rugged and is adapted to withstand the hardest kind of usage.

Further objects of the invention will hereafter appear and the invention is shown in one of its preferred forms in the accompanying drawings, in which—

Figure 1:
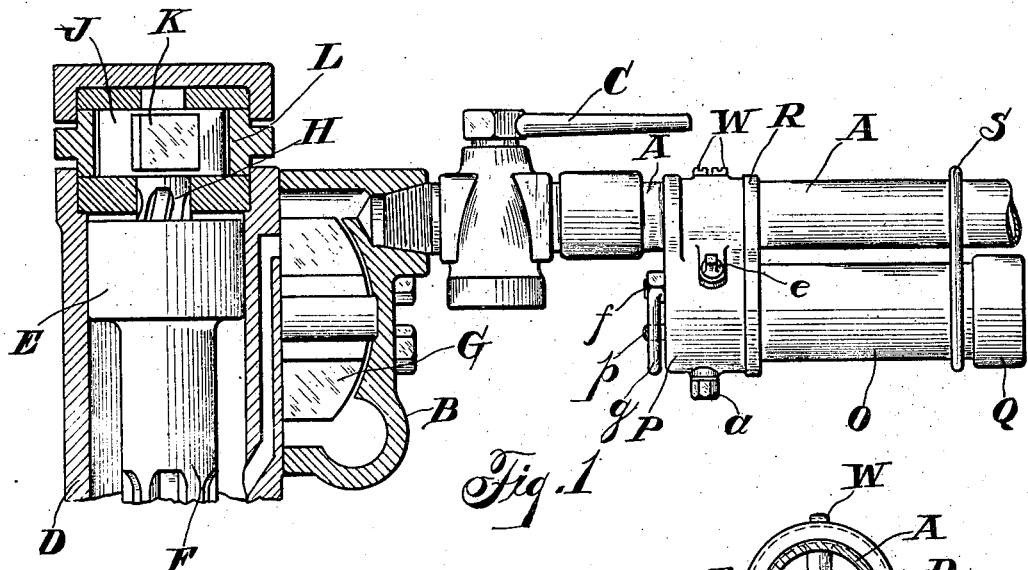
Figure 1, is a side elevation, partly in vertical section of a portion of a rock drill and an air line oiler associated therewith.
Figure 3:
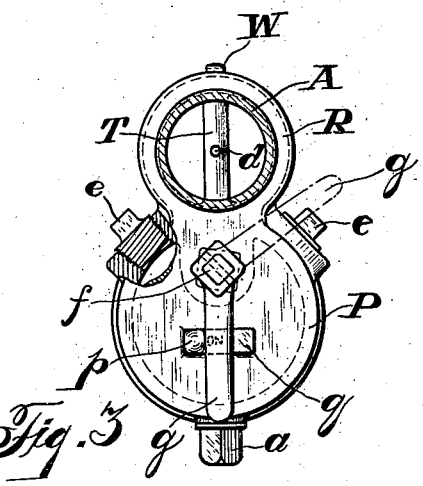
Figure 3 is a transverse section taken on the line 3—3 of Figure 2 looking in the direction of the arrows.
Figure 4:
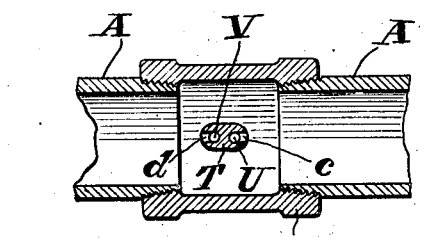
Figure 4 is a longitudinal section taken on the line 4—4 of Figure 2 looking in the direction of the arrows.
Figure 2:
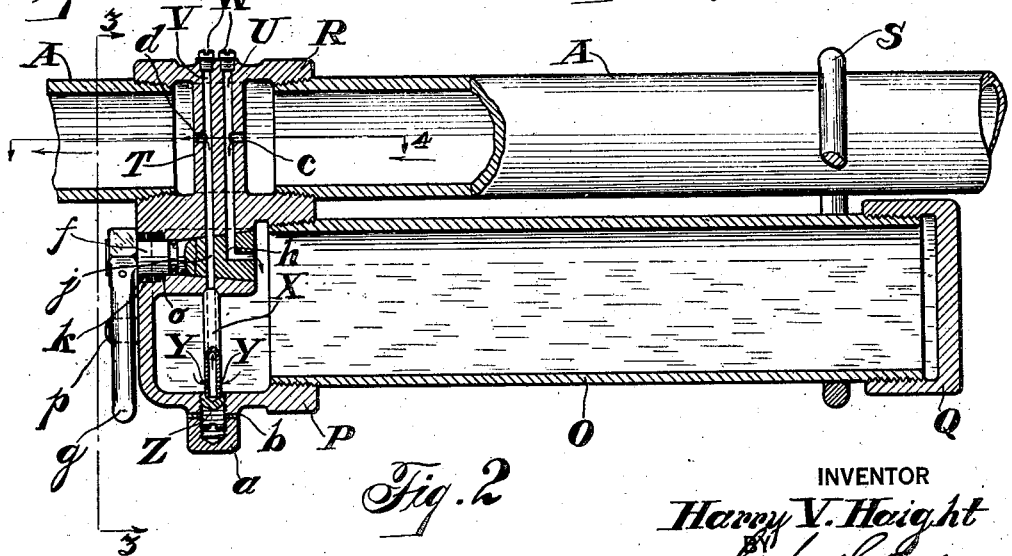
Figure 2 is an enlarged elevation, partly in vertical section, of the oiler shown in Figure 1.

Referring to the drawings, A designates an air line through which elastic pressure fluid, such as compressed air, is adapted to pass to any suitable source, and as shown in Figure 1, the air line A may communicate with a rock drill B, and a suitable throttle valve C is preferably connected to the air line A for controlling the supply of pressure fluid to the rock drill. In this instance only the rear end portion of a rock drill is shown for purposes of illustration, and the rock drill comprises a cylinder D in which a piston E, having a forward fluted shank F, is adapted to reciprocate, and the distribution of pressure fluid to the piston E is controlled by a suitable distributing valve G. A spiral fluted rifle bar H extends into the piston E, and is provided with an enlarged head J carrying the usual pawls K which are adapted to cooperate with a ratchet ring L. As the piston E reciprocates in the cylinder D, the rifle bar H will permit the piston to rotate in but one direction, and the piston E rotates the usual chuck into which the drill steel extends. Although a rock drill is shown in the drawings for illustrative purposes, it is to be understood that the present invention is applicable to any form of a machine which is operated by elastic pressure fluid.

In this instance, the air line oiler comprises a tubular reservoir O, which is closed at one end by the head P and at the opposite end by an internally screw threaded cap Q, although the cap and reservoir may be formed integrally if desired. The head P is preferably formed with an integral coupling member R, which is in this instance formed with internal screw threads for the reception of the screw threaded end portions of the pipe line A. The reservoir O, however, may be connected to the pipe line A in any suitable manner and in this instance, the opposite end of the reservoir is supported from the pipe line by a suitable strap S, thereby holding the reservoir in substantially parallel relationship to the pipe line A.

The coupling member R is in this instance formed with a central wall T which is preferably formed with passages U and V. One end of these passages is closed by suitable plugs W, and the passage U extends through part of the head P and is adapted to communicate with the upper portion of the reservoir O. The passage V in this instance extends through a part of the head P and communicates with a tube X which is preferably formed with radial ports Y. In order to hold the tube X in position, a screw threaded plug Z is screwed into the head P and is adapted to bear against one end of the tube X, and a cap $a$ is screwed onto the outwardly extending end of the plug Z for locking the plug in place and preventing injury thereto. A washer $b$ may be inserted between the cap $a$ and the head P, if desired.

The central wall T is in this instance formed with a port $c$, which communicates with the passage U and is positioned in the path of the pressure fluid flowing through the pipe line A, so that pressure fluid from the pipe line will flow through the passage U and into the reservoir O thereby creating a pressure on top of the lubricant. A port $d$ is also formed in the wall T and communicates with the passage V, but faces in the opposite direction from the port $c$.

As the pressure fluid passes through the pipe line A, a suction will be created in the passage V and lubricant will be drawn out of the reservoir O through the ports Y, tube X, passage V and port $d$. The pressure on the lubricant created by the pressure fluid from the air line A passing through the port $c$ and passage U will force the lubricant around the tube X and assist in the withdrawal of lubricant from the reservoir O. The head P is preferably formed with filling openings closed by suitable plugs $e$ for supplying lubricant to the reservoir O.

In order to regulate the amount of lubricant drawn from the reservoir O, a suitable controlling valve $f$, in this instance in the form of a tapered plug, is preferably mounted in the head P, and is provided with an actuating handle $g$. The valve $f$ is in this instance formed with a right angle port $h$ which is adapted to bring the passage U into communication with the upper part of the reservoir O, and a port $j$ which is adapted to be brought into communication with the passage V. A coil spring $k$ is preferably located in a recess $o$ in the head P and in this instance bears against the handle $g$ for holding the tapered valve $f$ to its seat.

A stop $p$ is preferably formed on the outer face of the head P for limiting the movement of the handle $g$ in one direction and a frictional slide-way $q$ is formed on the head P adjacent the stop $p$ and the word "On" is in this instance stamped on the slide-way $q$ so that the operator will know in what position the handle $g$ must be in order that lubricant will be drawn from the reservoir O.

This air line oiler has been found to operate satisfactorily and efficiently, and to convey sufficient lubricant to fluid actuated machines to obtain smooth running. As shown in Figure 1 lubricant from the reservoir O will pass with the pressure fluid into the rock drill B and lubricate the working parts, and the operator does not have to trouble himself with the lubricating of his machine.

I claim:

1. An air line oiler comprising in combination with an air line, a lubricant reservoir, a head for closing one end of said reservoir and a member extending from said head into said air line, said member being formed with a passage adapted to permit a portion of the pressure fluid from said air line to pass into the upper portion of said reservoir and a second passage adapted to communicate with a lower portion of said reservoir through which lubricant is adapted to be drawn.

2. An air line oiler comprising in combination with an air line, a lubricant reservoir, a head for closing one end of said reservoir, a member extending from said head into said air line, said member being formed with a passage adapted to permit a portion of the pressure fluid from said air line to pass into the upper portion of said reservoir and a second passage adapted to communicate with a lower portion of said reservoir through which lubricant is adapted to be drawn, and a manually operable valve for controlling said passages.

3. An air line oiler comprising in combination with an air line, a lubricant reservoir, means for closing one end of the said reservoir, a head closing the opposite end of said reservoir, a coupling member connected to said head and also connected to said air line, a central wall in said coupling member, said wall being formed with oppositely faced ports, one of said ports facing towards the flow of pressure fluid in said air line and the opposite port facing away from the flow of pressure fluid in the air line and passages communicating respectively with said ports, one of said passages adapted to permit a portion of pressure fluid from said air line to pass into the upper portion of said reservoir, and a tube communicating with said other passage for enabling lubricant to be drawn into said passage from the lower portion of said reservoir.

4. An air line oiler comprising in combination with an air line, a lubricant reservoir, means for closing one end of the said reservoir, a head closing the opposite end of said reservoir, a coupling member connected to said head and also connected to said air line, a central wall in said coupling member, said wall being formed with oppositely faced ports, one of said ports facing towards the flow of pressure fluid in said air line and the opposite port facing away from the flow of pressure fluid in the air line and passages communicating respectively with said ports, one of said passages adapted to permit a portion of pressure fluid from said air line to pass into the upper portion of said reservoir, a tube communicating with said other passage for enabling lubricant to be drawn into said passage from the lower portion of said reservoir, and a manually operable valve for controlling said passages.

In testimony whereof I have signed this specification.

HARRY V. HAIGHT.